US005715168A

United States Patent [19]
Ito

[11] Patent Number: 5,715,168
[45] Date of Patent: Feb. 3, 1998

[54] AUTO-HANDLER SYSTEM PREVENTING DELIVERY OF INTEGRATED CIRCUITS TO DEFECTIVE SOCKETS

[75] Inventor: Daijiro Ito, Tokyo, Japan

[73] Assignee: Ando Electric Co., Ltd., Tokyo, Japan

[21] Appl. No.: 564,571

[22] Filed: Nov. 28, 1995

[30] Foreign Application Priority Data

Nov. 29, 1994 [JP] Japan .................................. 6-321647

[51] Int. Cl.$^6$ ........................................................ G06F 19/00
[52] U.S. Cl. ............................. 364/478.03; 364/468.17; 364/468.28; 364/490; 29/705
[58] Field of Search .................... 364/478.01, 478.03, 364/478.13, 468.16, 468.17, 468.28, 489–491; 414/935–941; 29/705, 739, 740

[56] References Cited

U.S. PATENT DOCUMENTS

| | | | |
|---|---|---|---|
| 4,817,273 | 4/1989 | Lape et al. | 29/741 |
| 4,947,545 | 8/1990 | Gussman | 29/705 |
| 5,209,132 | 5/1993 | Chayamichi et al. | 73/865.9 |
| 5,475,695 | 12/1995 | Caywood et al. | 364/468.28 X |

*Primary Examiner*—Joseph Ruggiero
*Attorney, Agent, or Firm*—Finnegan, Henderson, Farabow, Garrett & Dunner, L.L.P.

[57] ABSTRACT

An auto-handler system is constructed by a supply device, a measurement device and a storage device, through which a carrier circulates. A plurality of IC sockets are arranged on the carrier; and an identification mark, such as a bar-code mark, is attached to the carrier. The supply device supplies ICs to the carrier in accordance with the identification mark so that the ICs are mounted respectively on the IC sockets. The carrier is transported to the measurement device wherein measurement is performed on the ICs. After the measurement, the carrier is transported to the storage device wherein the ICs are removed and classified storage is performed on the ICs. Thereafter, a vacant carrier is returned to the supply device. If defective decision is made on the carrier based on result of measurement, the measurement device creates defective information representing position of an defective IC socket of the carrier. Herein, an IC socket is found defective if the result of measurement continuously indicates that a defective category CS appears continuous-defective-times NS. So, if the supply device receives a carrier for which the defective information ICs created, the supply device controls supplying of ICs to IC sockets of the carrier in response to the defective information in such a way that an IC is not supplied to the defective IC socket. Moreover, visual display is performed about the identification mark and positions of IC sockets, to which ICs are supplied, as well as the defective information.

7 Claims, 10 Drawing Sheets

FIG.13

| ALARM |

*CONTINUOUS-DEFECTIVE ALARM [CONTACT 18]*

AUTO-HANDLER SYSTEM PREVENTING DELIVERY OF INTEGRATED CIRCUITS TO DEFECTIVE SOCKETS

BACKGROUND OF THE INVENTION

The invention relates to an auto-handler system wherein a carrier, providing IC sockets on which ICs are mounted, circulates so that measurement is performed on the ICs.

First, a construction of a carrier will be described with reference to FIGS. 7A and 7B. Herein, a carrier 4 is shown; and 4A denotes an IC socket with a cover. On the carrier 4, a plurality of IC sockets 4A are arranged in both a longitudinal direction and a lateral direction. The IC is mounted on the IC socket 4A and is transported with a cover closed.

FIG. 8 is a plan view showing a construction of a first transfer device which is used for a former process of an auto handler. Incidentally, the first transfer device is called a supply device. In FIG. 8, 11 denotes a carrier loading section; 12 denotes a supply hand; 13 denotes an transfer section; 14A and 14B denote tray loading sections.

In FIG. 8, the carrier loading section 11 has an ability of loading the carrier 4 up to one-hundred pieces. Each of the tray loading sections 14A and 14B has an ability of loading trays up to one-hundred pieces, wherein each tray stores multiple ICs. At first, one vacant carrier 4 is pulled out of the carrier loading section 11 and is transported to the transfer section 13. The supply hand 12 absorbs ICs from the trays of the tray loading sections 14A and 14B; and the ICs are successively transferred to the carrier 4 placed in the transfer section 13. If the ICs are completely mounted on all of the IC sockets of the carrier 4, the carrier 4 is returned to the carrier loading section 11. Next, another vacant carrier 4 is transported to the transfer section 13, so that the aforementioned process is repeated. Thus, in the supply device 1, ICs, provided from the trays, are transferred to all of vacant carriers in the carrier loading section 11.

FIG. 9 is a plan view showing construction of an auto handler. Incidentally, the auto handler of FIG. 9 will be called a measurement device. In FIG. 9, 21 and 22 denote carrier loading sections; 23A denotes a pre-cooling section; 23B denotes a pre-heating section; 24A denotes a measurement section in a low-temperature bath; and 24B denotes a measurement section in a high-temperature bath.

In the measurement device, electric-current characteristics and/or voltage characteristics of the ICs are measured. Further, performing the measurement by applying the heat to the ICs, it is possible to decide which IC is defective.

In FIG. 9, the carrier loading section 21 has an ability of loading the carrier 4, in which ICs are stored by the supply device 1, up to one-hundred pieces. The carrier 4, provided in the carrier loading section 21, is transported to the pre-cooling section 23A, wherein ICs are cooled down to a target temperature. Next, the carrier 4 is transported to the measurement section 24A, wherein ICs of the carrier 4 are all subjected to low-temperature measurement. If the low-temperature measurement is completed, the carrier 4 is returned to the pre-cooling section 23A. Next, the carrier 4 is transported to the pre-heating section 23B.

In the pre-heating section 23B, ICs of the carrier 4 are heated to a target temperature. Next, the carrier 4 is transported to the measurement section 24B, wherein all of the ICs of the carrier 4 are subjected to high-temperature measurement. If the high-temperature measurement is completed, the carrier 4 is returned to the pre-heating section 23B. Next, the carrier 4 is transported to the carrier loading section 22. The carrier loading section 22 has an ability of loading the carrier 4 up to one-hundred pieces.

The measurement device 2 of FIG. 9 performs high-temperature measurement. However, if temperature control is not performed for the measurement device 2, it is possible to perform parallel measurement at a normal temperature. By changing the temperature of either the measurement section 24A or 24B to the normal temperature, it is possible to perform parallel measurement.

FIG. 10 is a plan view showing construction of a second transfer device which is used in a latter process of the measurement device 2 of FIG. 9. Incidentally, the second transfer device will be called a storage device. In FIG. 10, 31 denotes a carrier loading section; 32 denotes a storage hand; 33 denotes a transfer section; 34A and 34B denote vacant-tray loading sections; and 35A to 35C denote tray loading sections.

The storage device of FIG. 10 loads the carrier 4, which has been subjected to measurement by the measurement device 2, up to one-hundred pieces. Each of the vacant-tray loading sections 34A and 34B has an ability of loading the vacant tray up to one-hundred pieces. The storage hand 32 transports each one piece of the vacant trays, which are loaded in the vacant-tray loading sections 34A and 34B, to the tray loading sections 35A to 35C.

One piece of the carrier 4 is pulled out of the carrier loading section 31 and is transported to the transfer section 33. The storage hand 32 absorbs ICs from the carrier 4, so that the ICs are successively transported to the vacant trays of the tray loading sections 35A to 35C. If no IC remains in the carrier 4 which is placed at the transfer section 33, the carrier 4 is returned to the carrier loading section 31. Next, another carrier, holding ICs, is moved to the transfer section 33, so the aforementioned process is repeated. As a result, in the storage device 3, all of the ICs of the carriers, which are loaded in the carrier loading section 31, are transferred to the trays of the tray loading sections 35A to 35C. Incidentally, the vacant carriers of the storage device 3 are used by the supply device 1.

As described above, the carrier 4 is moved from the supply device 1 to the measurement device 2 and is then moved from the measurement device 2 to the storage device 3; thereafter, the carrier 4 circulates from the storage device 3 to the supply device 1. For transportation of the carrier 4 between those devices, it is possible to use a transport device employing a belt conveyer.

In an example of an auto-handler system as shown by FIGS. 8 to 10, if a defect due to destruction of a contact pin (or contact pins) of a specific IC socket 4A of the carrier 4 occurs, an IC is prevented from being mounted on such a defective IC socket 4A.

On the basis of measurement using an IC tester, it is possible to specify the location of the defective IC socket on the carrier 4 by watching a visual display which is equipped with the measurement device 2. If the location of the defective IC socket is given, the setting is changed so that an IC is not mounted on the defective IC socket.

As a result, the supply hand 12, provided in the supply device 1, is controlled not to supply an IC to the location of the defective IC socket 4A with respect to the carrier; in the measurement device 2, measurement is not performed on the IC at the location of the defective IC socket of the carrier; and in the storage device 3, the storage hand 32 is controlled not to be moved to the location of the defective IC socket of the carrier.

In the system, a control section of the measurement device 2 sets a defective category 'CS' as well as the number of times for performing defective measurement continuously 'NS' (hereinafter, simply referred to as continuous-defective-times NS). In the system using the IC tester, it is possible to perform multi-classification for ICs. For example, there are provided multiple classification categories '0' to 'F'; and the classification category 'F' is set as the defective category for IC sockets. In addition, the continuous-defective-times NS is set at '5'; therefore, if the result of testing continuously indicates that the category F appears five times continuously, it is judged that the IC socket 4A is found defective.

If the measurement device of FIG. 9 discriminates a defective IC socket, it may be possible to change it with a non-defective IC socket. However, changing of the IC socket will reduce an efficiency in IC testing. So, the measurement device stores address of the defective IC socket of the carrier; and measurement is controlled not to be performed on an IC at such a defective address.

Therefore, the supply device supplies ICs to all of IC sockets with respect to all of carriers; the measurement device does not perform measurement on a non-defective IC of a defective IC socket; and the storage device treats the IC of the defective IC socket as a defective article. This is a waste of time and an inefficient way of measuring ICs.

SUMMARY OF THE INVENTION

It is an object of the invention to provide an auto-handler system which is capable of improving throughput in measurement of ICs by avoiding supplying an IC to a defective IC socket of a carrier on the basis of an identification mark.

An auto-handler system of the invention is mainly constructed by a supply device, a measurement device and a storage device, through which a carrier circulates. A plurality of IC sockets are arranged on the carrier; and an identification mark, such as a bar-code mark, is attached to the carrier. The supply device supplies ICs to the carrier in accordance with the identification mark so that the ICs are mounted respectively on the IC sockets. The carrier is transported to the measurement device wherein measurement is performed on the ICs. After the measurement, the carrier is transported to the storage device wherein the ICs are removed and classified storage is performed on the ICs. Thereafter, a vacant carrier is returned to the supply device.

If defective decision is made on the carrier based on result of measurement, the measurement device creates defective information representing position of an defective IC socket of the carrier. The defective decision is made using a defective category CS and continuous-defective-times NS which are set in advance. Herein, an IC socket is found defective if the result of measurement continuously indicates that the defective category CS appears the continuous-defective-times NS. So, if the supply device receives a carrier for which the defective information is created, the supply device controls supplying of ICs to IC sockets of the carrier in response to the defective information in such a way that an IC is not supplied to the defective IC socket.

Moreover, visual display is performed with respect to the carrier about the identification mark and positions of IC sockets, to which ICs are supplied, as well as the defective information.

BRIEF DESCRIPTION OF THE DRAWINGS

These and other objects of the subject invention will become more fully apparent as the following description is read in light of the attached drawings wherein:

FIGS. 11 to 13 are examples of screen images which are displayed by the visual display unit in accordance with the embodiment of the invention.

DESCRIPTION OF THE PREFERRED EMBODIMENT

Figure 7A:
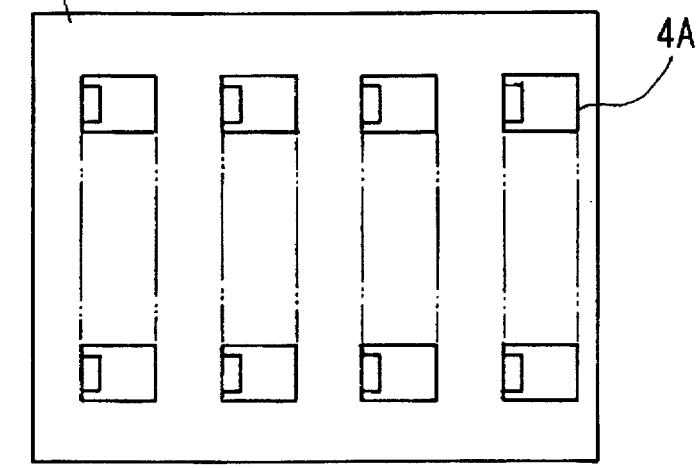
FIGS. 7A and 7B are drawings which illustrate an appearance of a carrier.
Figure 7B:

Next, a configuration of an auto-handler system, which is designed in accordance with an embodiment of the invention, will be described with reference to FIG. 1. Herein, a carrier 4, as shown by FIGS. 7A and 7B, circulates through a supply device 1, a measurement device 2 and a storage device 3. The supply device 1 is configured by a control unit 1A, a carrier discrimination unit 1B, a supply unit 1C, a communication unit 1D, a store unit 1E and a visual display unit 2F. The measurement device 2 is configured by a control unit 2A, a carrier discrimination unit 2B, a measurement unit 2C, a communication unit 2D, a store unit 2E and a visual display unit 2F. The storage device 3 is configured by a control unit 3A, a carrier discrimination unit 3B, a storage unit 3C, a communication unit 3D, a store unit 3E and a visual display unit 3F.

Figure 1:
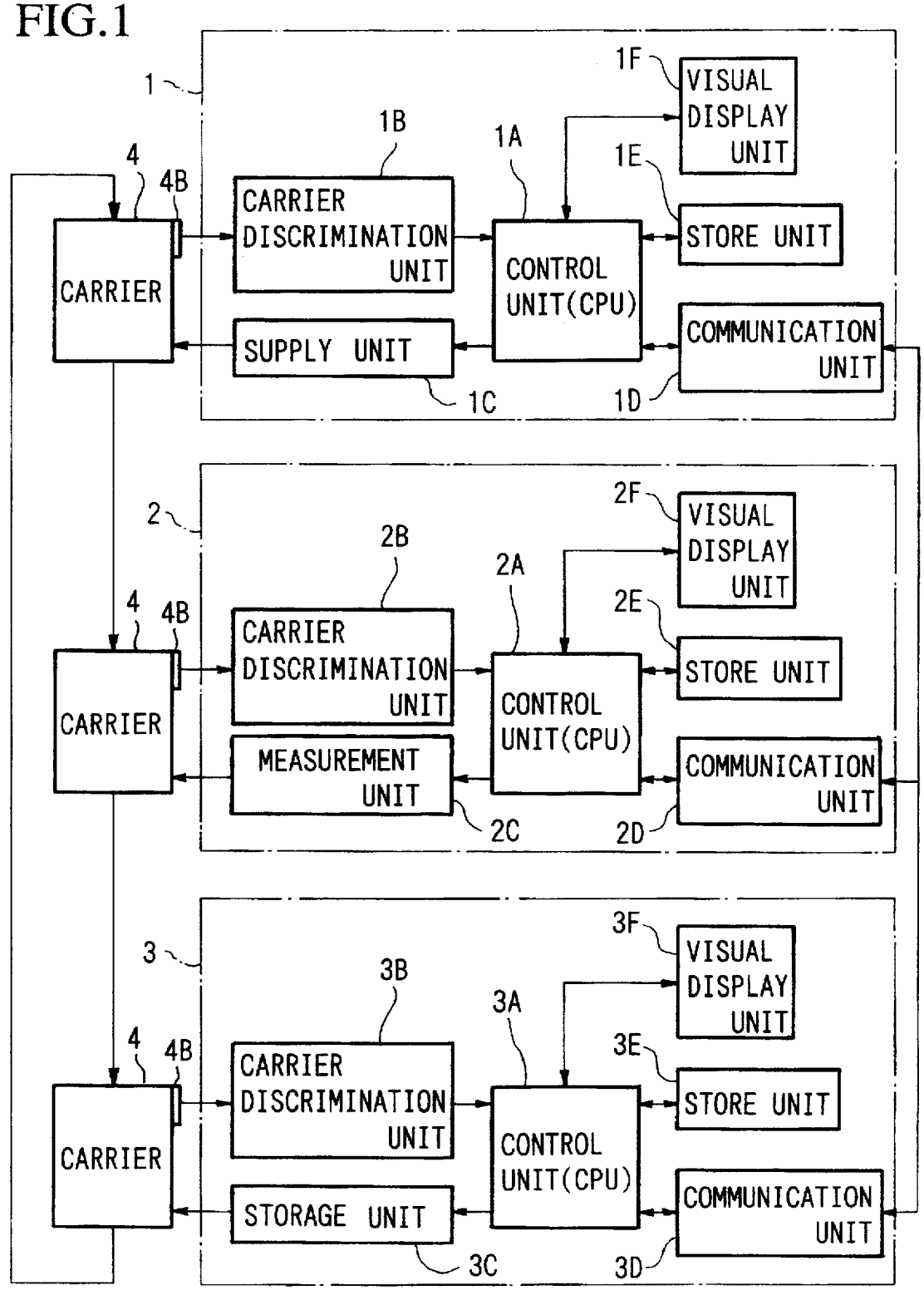
FIG. 1 is a block diagram showing a configuration of an auto-handler system which is designed in accordance with an embodiment of the invention.
Figure 8:
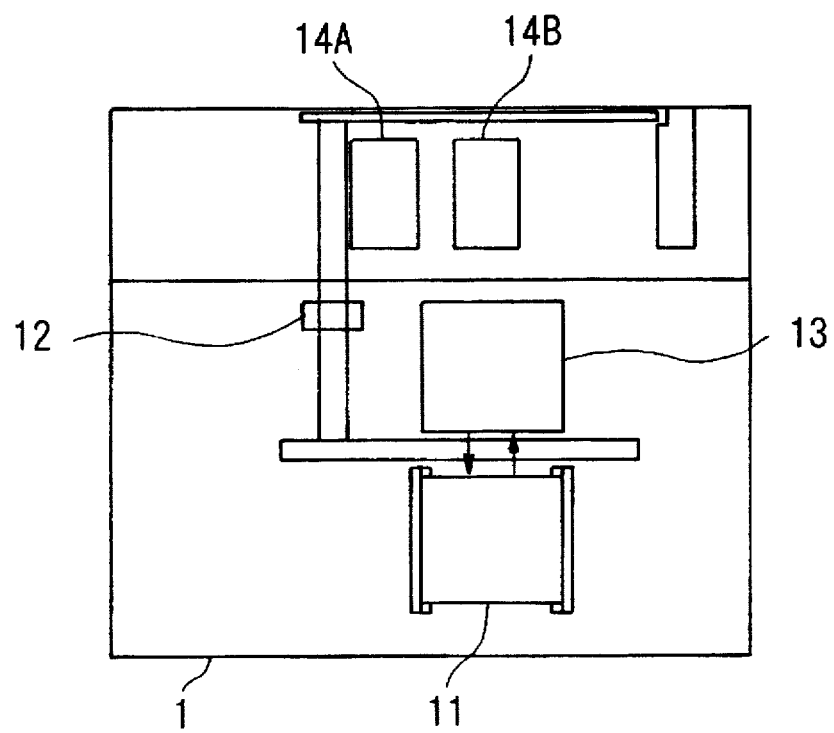
FIG. 8 is a plan view showing a construction of the supply device.
Figure 9:
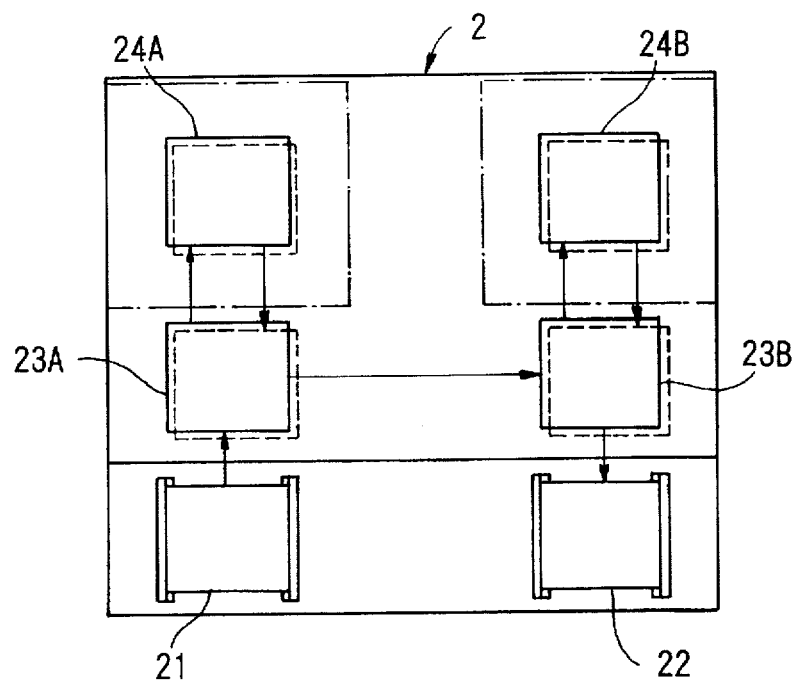
FIG. 9 is a plan view showing a construction of the measurement device.
Figure 10:
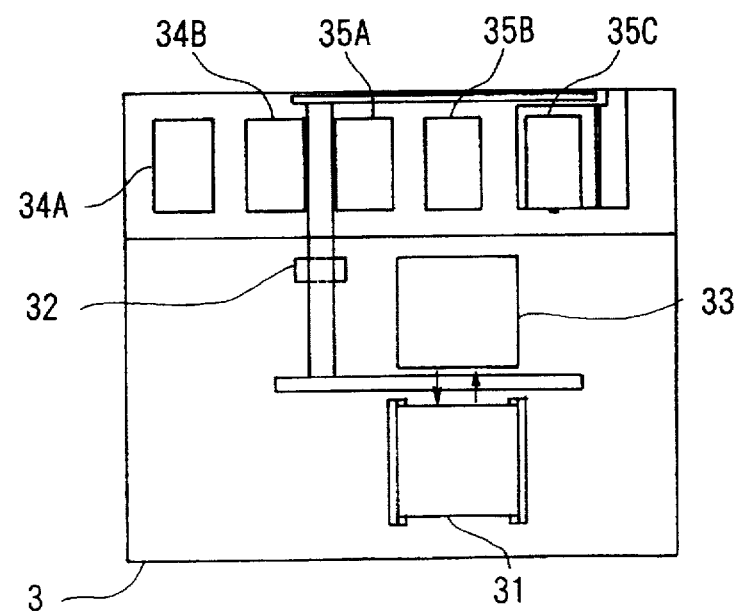
FIG. 10 is a plan view showing a construction of the storage device.

Blocks of the supply device 1 in FIG. 1 represent functions of the supply device 1 of FIG. 8; blocks of the measurement device 2 in FIG. 1 represent functions of the measurement device 2 of FIG. 9; and blocks of the storage device 3 in FIG. 1 represent functions of the storage device 3 of FIG. 10.

The most important feature of the invention is provision of an identification mark 4B which is attached to the carrier 4 of FIG. 7. The identification mark 4B is provided to specify each carrier. As the identification mark 4B, it is possible to employ a bar-code mark and a resistor, for example. If the bar-code mark is employed as the identification mark 4B, the bar-code mark is adhered to a surface of a side wall of the carrier 4. If the bar-code mark is employed, a bar-code reader is employed as the carrier discrimination units 1B, 2B and 3B respectively.

If the resistor is employed as the identification mark 4B, the resistor is attached to the side wall of the carrier 4. Herein, by changing resistance of the resistor with respect to each carrier, it is possible to specify the each carrier. If a resistor is employed, a resistance reader is employed as the carrier discrimination units 1B, 2B and 3B respectively.

In FIG. 1, the control units 1A, 2A and 3A are CPUs, wherein each CPU is provided to control elements of each device as well as to perform calculations. As the store units 1E, 2E and 3E, it is possible to use RAMs, for example. So, various kinds of information are written into them or read out from them in accordance with instructions issued by the control units 1A, 2A and 3A. As the communication units 1D, 2D and 3D, it is possible to use LANs (i.e., local area networks) or GPIB devices (i.e., devices based on IEEE-488 standard), for example. The communication unit 1D of the supply device 1 is interconnected with the communication unit 2D of the measurement device 2; and the communication unit 2D is interconnected with the communication unit 3D of the storage device 3. As the visual display units 1F, 2F and 3F, it is possible to use display monitors, for example.

The supply unit 1C of the supply device 1 indicates a drive mechanism of the supply hand 12. In the supply device 1, the carrier discrimination unit 1B reads the identification mark 4B to discriminate a carrier number of the carrier 4. The control unit 1A issues instructions, by which IC-supply addresses regarding the carrier number discriminated are read out from the store unit 1E. Then, the supply unit 1C supplies ICs to the carrier 4 in accordance with the IC-supply addresses.

In the measurement device 2, the carrier discrimination unit 2B reads the identification mark 4B to discriminate a carrier number of the carrier 4. The control unit 2A issues instructions, by which IC-supply addresses regarding the carrier number discriminated are read out from the store unit 2E. Then, the measurement unit 2C performs measurement on ICs which correspond to the IC-supply addresses. The result of the measurement is written into the store unit 2E.

The control unit 2A accesses the store unit 2E so as to read out the continuous-defective-times NS and defective category CS as well as the result of previous measurement of the carrier 4 of the discriminated carrier number. Then, a decision is made as to whether or not the defective category CS repeatedly appears in previous tests, which are performed by NS times continuously, with respect to each of the ICs of the carrier 4. If the defective category repeatedly appears with respect to a certain IC socket, an alarm message regarding a continuous-defective event (hereinafter, simply referred to as continuous-defective-alarm message) is displayed on a screen of the visual display unit 2F with respect to an address of the certain IC socket. Thus, it is detected that the IC socket is defective.

At occurrence of the continuous-defective event, the communication unit 2D provides information regarding the carrier number and address of the IC socket which relates to the continuous-defective event. The information is transmitted to the supply device 1. In the supply device 1, an IC-supply address, which corresponds to the carrier number relating to the continuous-defective event, is read out from the store unit 1E. Then, the contents of the store unit 1E are re-written to avoid supplying of an IC to such a defective IC socket relating to the continuous-defective event. Thereafter, the supply device 1 is controlled such that no IC is delivered to an address of the defective IC socket of the carrier 4.

In the storage device 3, the carrier discrimination unit 3B reads the identification mark 4B, attached to the carrier 4, so as to discriminate a carrier number of the carrier 4. Then, the control unit 3A instructs the communication unit 3D to read out and receive the result of measurement, relating to the discriminated carrier number, from the measurement device 2. Based on the result of measurement, the storage unit 3C performs classification and storage on the ICs of the carrier 4.

Figure 2:
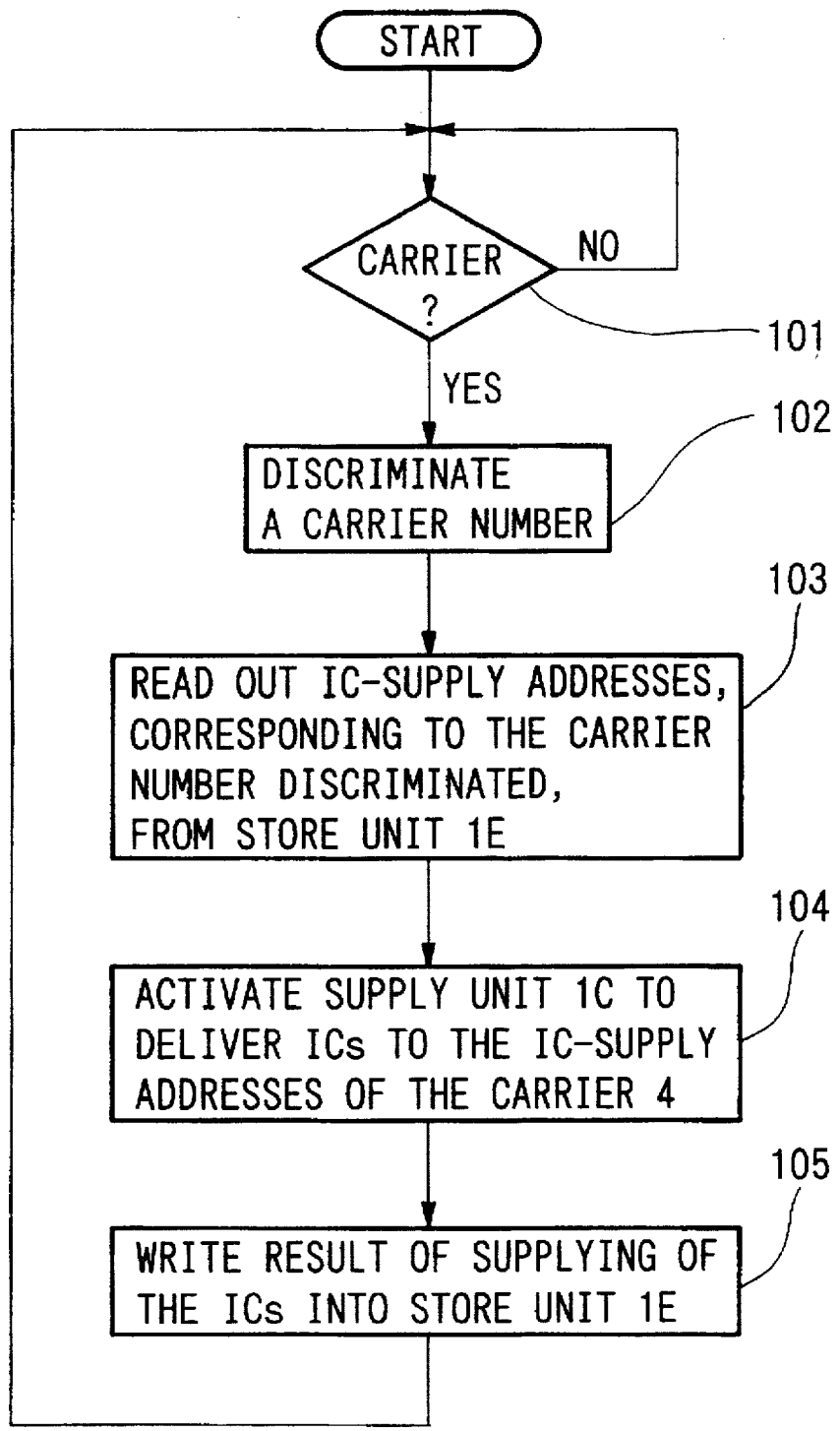
FIG. 2 is a flowchart showing normal operations of a supply device shown in FIG. 1.

Next, normal operations of the supply device 1 will be described with reference to a flowchart of FIG. 2. In step 101, a decision is made as to whether or not the carrier 4 is transported to the transfer section 13. If so, the control unit 1A proceeds to step 102 in which the carrier discrimination unit 1B discriminates the carrier number of the carrier 4. In step 103, the control unit 1A accesses the store unit 1E to read out the IC-supply addresses with respect to the discriminated carrier number. In step 104, the supply unit 1C supplies ICs to the IC-supply addresses. In step 105, the control unit 1A writes the result of supplying of the ICs into the store unit 1E. Thereafter, the control unit 1A proceeds back to step 101. The above operations are repeated until no carrier, to which ICs are not supplied, remains in the carrier loading section 11.

Figure 3:
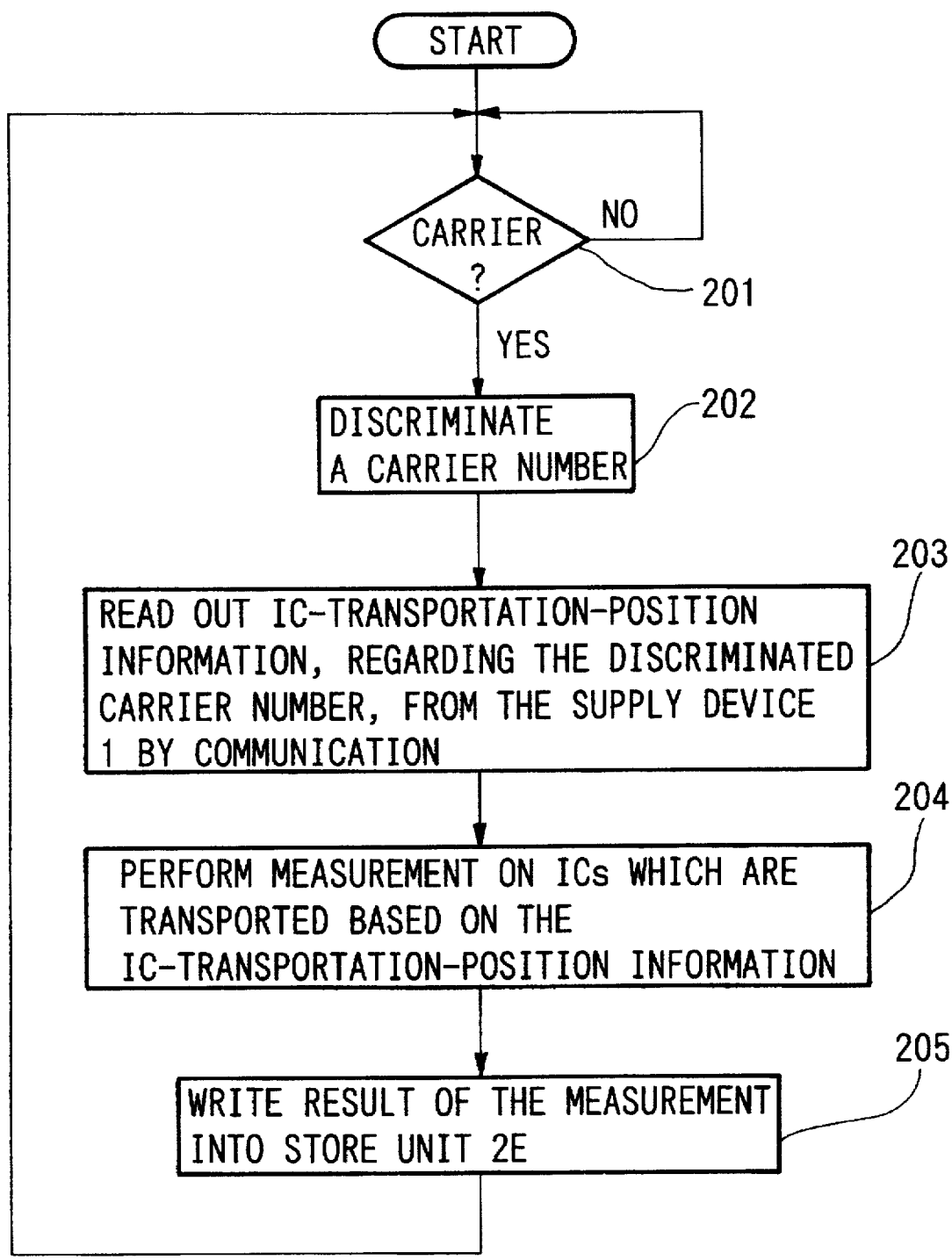
FIG. 3 is a flowchart showing normal operations of a measurement device shown in FIG. 1.

Next, normal operations of the measurement device 2 will be described with reference to a flowchart of FIG. 3. In step 201, a decision is made as to whether or not the carrier 4 is transported to the pre-cooling section 23A. If so, the control unit 2A proceeds to step 202 wherein the carrier discrimination unit 2B discriminates a carrier number of the carrier 4. In step 203, the measurement device 2 communicates with the supply device 1 so that the communication unit 2D reads out and receives IC-transportation-position information with respect to the discriminated carrier number, wherein the IC-transportation-position information represent positions of ICs supplied in each carrier. In step 204, the measurement unit 2C performs measurement on ICs of the carrier 4 which is transported based on the IC-transportation-position information, in step 205, the control unit 2A writes the result of the measurement into the store unit 2E. Then, the control unit 2A proceeds back to the step 201. The above operations are repeated until no carrier, to which ICs are supplied, remains.

Figure 4:
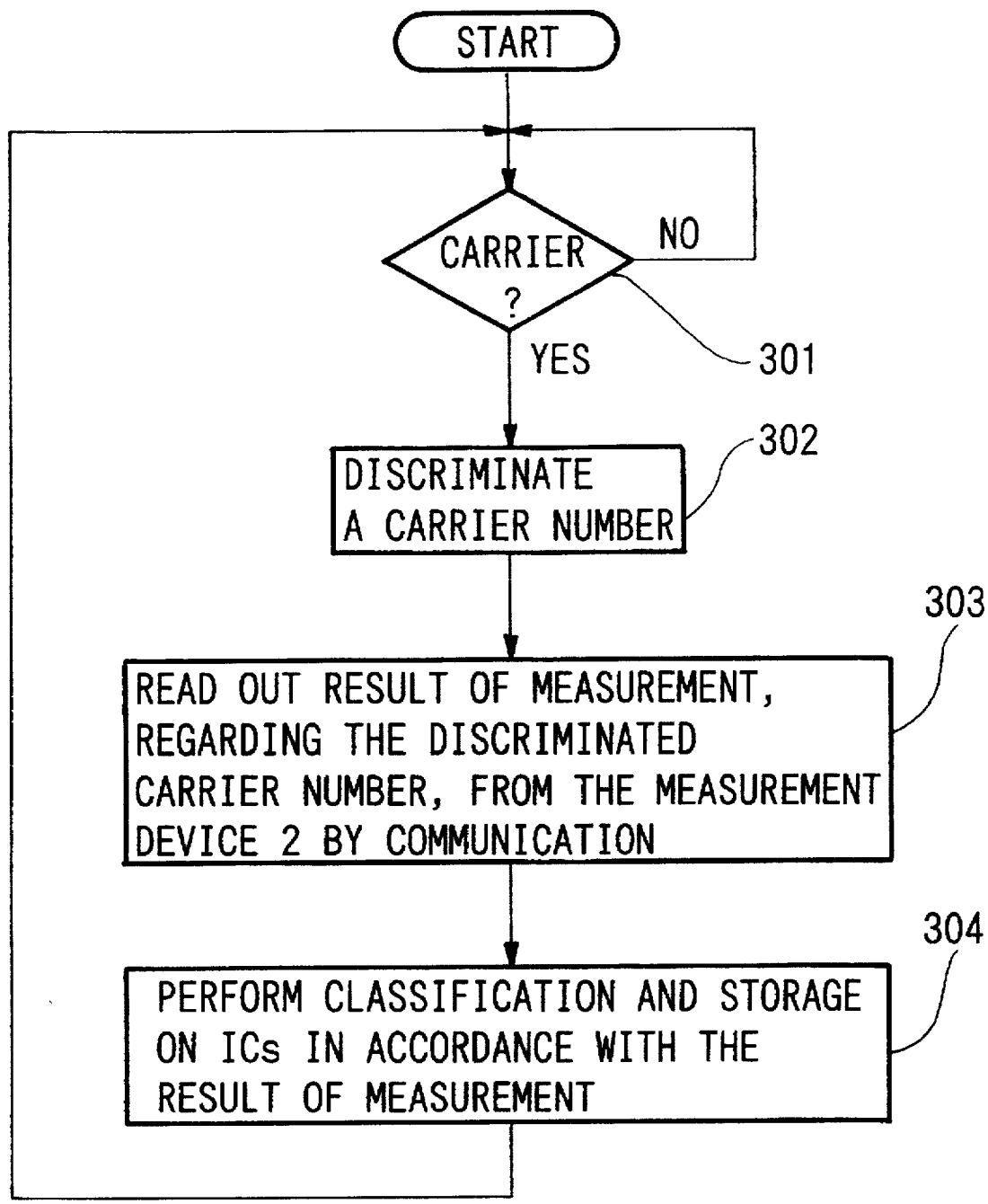
FIG. 4 is a flowchart showing normal operations of a storage device shown in FIG. 1.

Next, normal operations of the storage device 3 will be described with reference to a flowchart of FIG. 4. In step 302, a decision is made whether or not the carrier 4 is transported to the transfer section 33. If so, the control section 3A proceeds to step 302 wherein the carrier discrimination unit 3B discriminates a carrier number of the carrier 4. In step 303, the storage device 3 communicates with the measurement device 2 so that the communication unit 3D reads out and receives result of measurement with respect to the discriminated carrier number. In step 304, the storage unit 3C performs classification and storage on ICs of the carrier 4 in accordance with the result of measurement. Then, the control section 3A proceeds back to the step 301. The above operations are repeated until no carrier, which carries the ICs after the measurement, remains.

Figure 5:
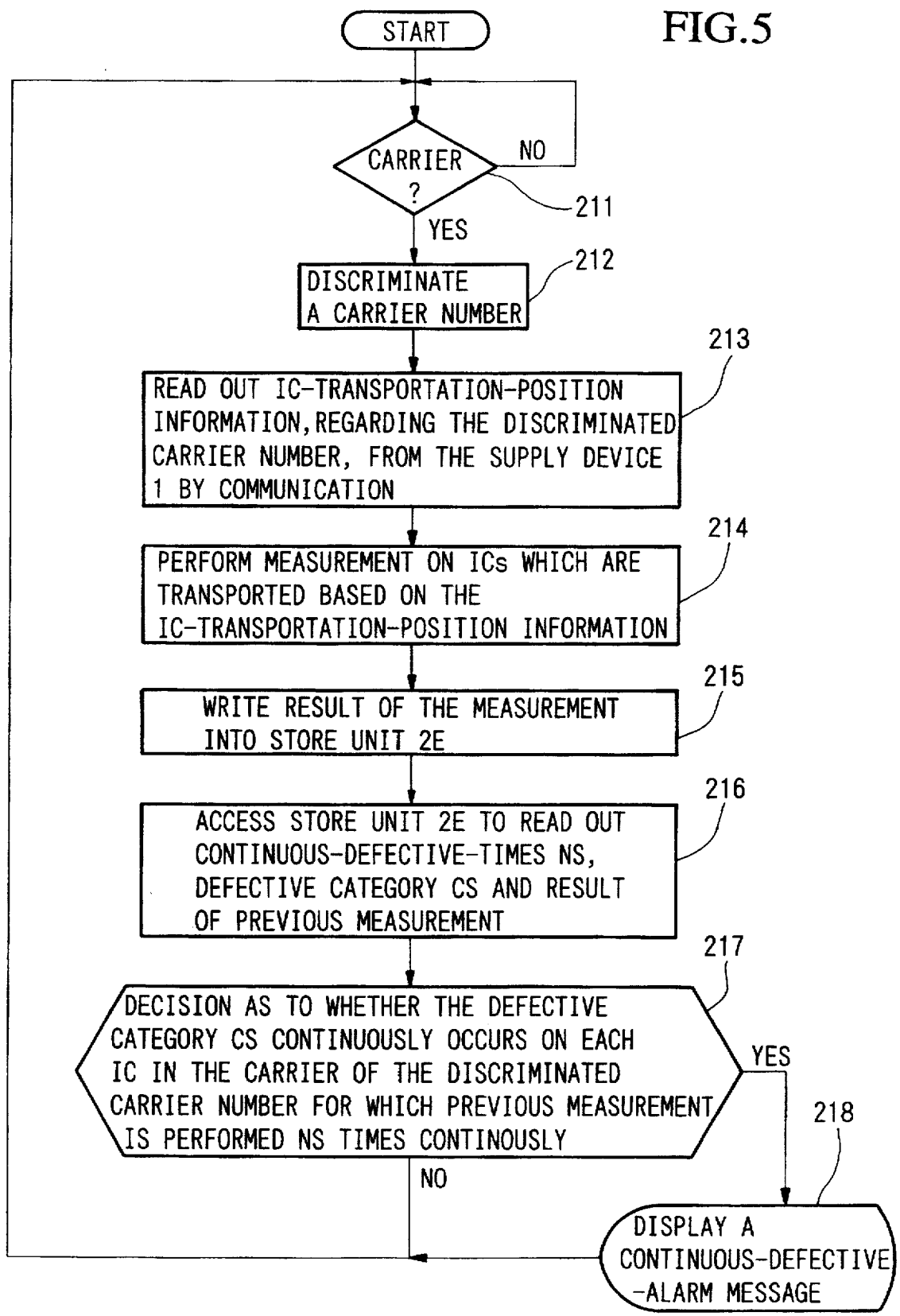
FIG. 5 is a flowchart showing alarm-activating operations which allow displaying of a continuous-defective-alarm message on a screen of a visual display unit.

Next, alarm-activating operations of the measurement device 2, by which an alarm message is displayed, will be described with reference to a flowchart of FIG. 5. In FIG. 5, steps 211 to 215 are equivalent to the aforementioned steps 201 to 205 in FIG. 3; hence, the description thereof will be omitted.

In step 216, the control unit 2A accesses the store unit 2E so as to read out the continuous-defective-times NS and the defective category CS as well as result of previous measurement for the carrier 4 of the discriminated carrier number. As described before, an IC socket is judged as defective if the result of measurement on an IC of the IC socket belongs to the defective category. If such a defective event emerges continuously over the continuous-defective-times NS, a continuous-defective-alarm message is displayed. In addition, the defective category CS is provided to indicate that the IC socket is defective.

In step 217, decision is made whether the defective category CS continuously appears in results of the measurement which has been previously performed NS times with respect to each of the ICs of the carrier 4 of the discriminated carrier number. If such a continuous defective event does not occur, the control unit 2A proceeds back to the step 211. If the continuous defective event occurs, the control unit 2A proceeds to step 218 wherein a continuous-defective-alarm message is displayed with respect to the IC socket which continuously belongs to the defective category NS times.

Then, the control unit 2A proceeds back to the step 211. The above operations are repeated until no carrier, which carries ICs after the measurement, remains.

Next, defective-related operations of the devices 1 and 2, which relate to occurrence of the continuous defective event, will be described with reference to FIGS. 6A and 6B.

Figure 6A:
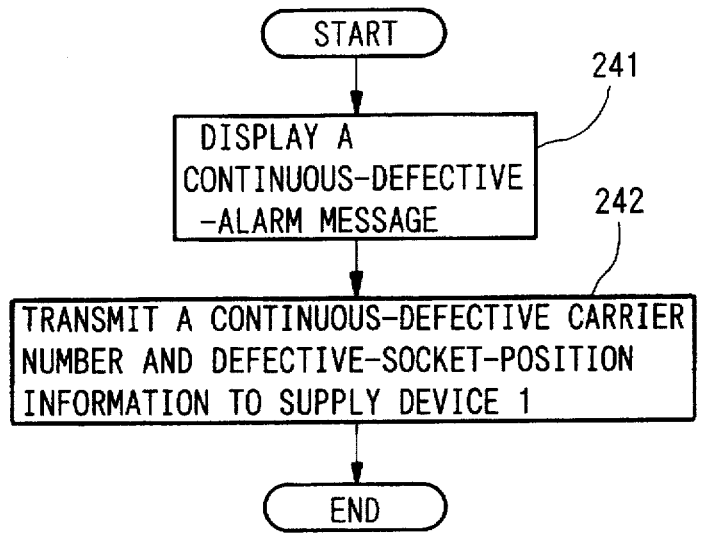
FIG. 6A is a flowchart showing defective-related operations of the measurement device.

FIG. 6A is a flowchart of the measurement device 2 in which a continuous defective event occurs in the carrier 4. In step 241, the visual display unit 2F displays a continuous-defective-alarm message on a screen thereof. This step 241 is equivalent to step 218 in FIG. 5. In step 242, a continuous-defective carrier number and defective-socket-position information are produced with respect to the carrier in which the continuous defective event occurs; and they are transmitted to the supply device 1.

Figure 6B:
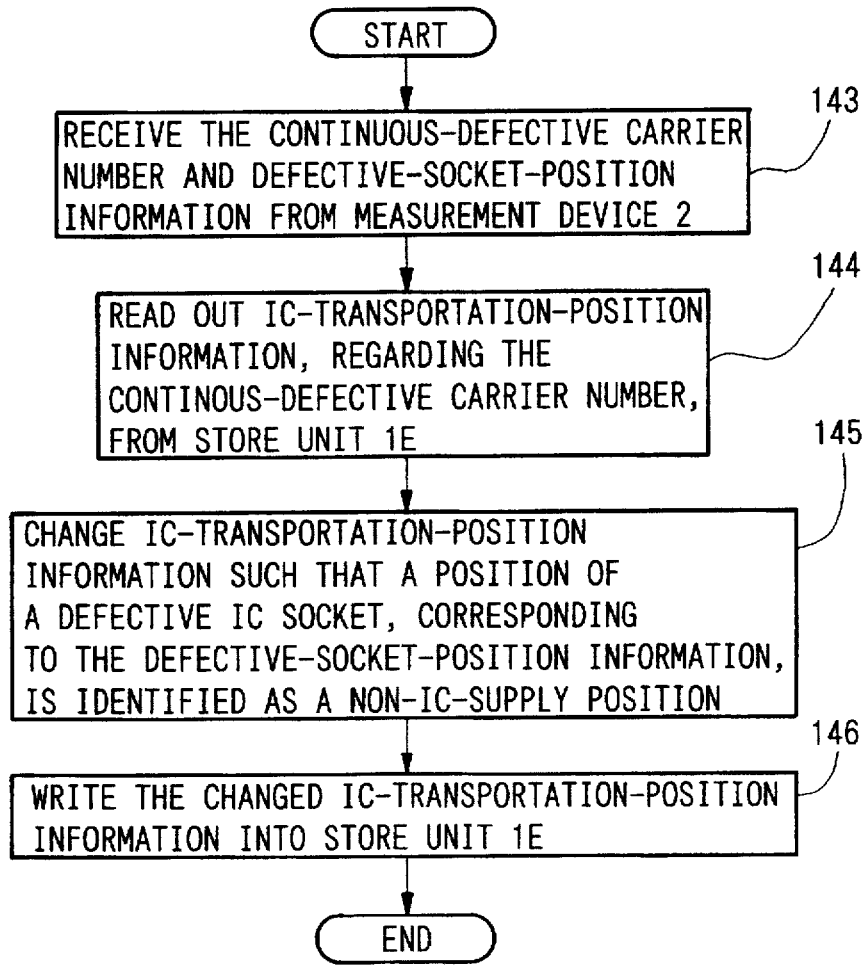
FIG. 6B is a flowchart showing defective-related operations of the supply device.

FIG. 6B is a flowchart for the supply device 1 in connection with the continuous defective event. In step 143, the supply device 1 receives the continuous-defective carrier number and defective-socket-position information from the measurement device 2. In step 144, the control unit 1A accesses the store unit 1E to read out IC-transportation-position information with respect to the continuous-defective carrier number received. In step 145, the IC-transportation-position information is changed such that a position of a defective IC socket, which corresponds to the defective-socket-position information, is identified as a non-IC-supply position. In step 146, the changed IC-transportation-position information is written into the store unit 1E. Thereafter, no IC is supplied to the position of the defective IC socket in the carrier 4. As a result, throughput for measurement of ICs is improved.

Figure 11:
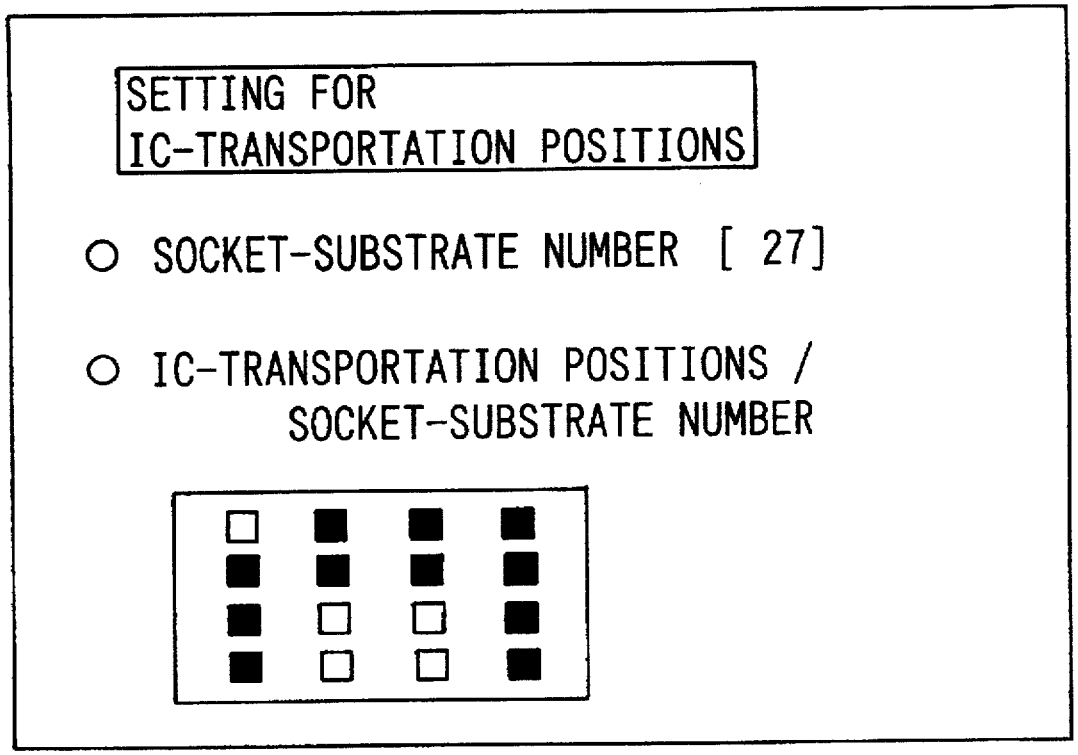

FIG. 11 shows a first example of a screen image of the visual display unit. The screen image relates to "SETTING FOR IC-TRANSPORTATION POSITIONS", wherein the IC-transportation positions are displayed with respect to each carrier number.

Figure 12:
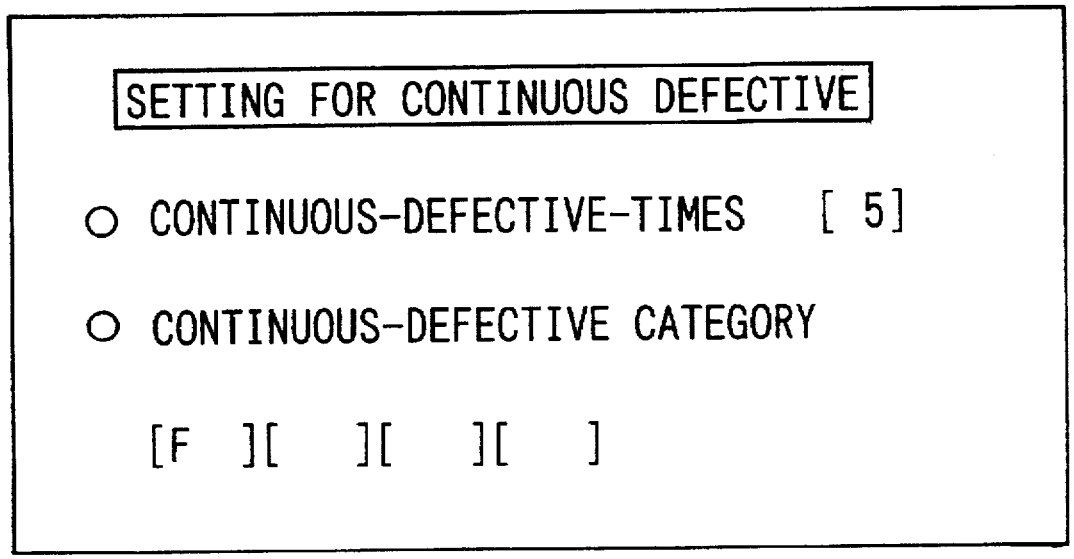

FIG. 12 shows a second example of a screen image of the visual display unit. The screen image relates to "SETTING FOR CONTINUOUS DEFECTIVE", wherein the continuous-defective-times and defective category are displayed.

FIG. 13 shows a third example of a screen image of the visual display unit. The screen image relates to "ALARM", wherein alarm information is displayed responsive to occurrence of a continuous-defective event.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. An auto-handler system comprising:

a carrier on which a plurality of IC sockets are arranged and to which an identification mark is attached;

a supply device for supplying ICs to the IC sockets of the carrier in accordance with the identification mark so that the ICs are mounted respectively on the IC sockets;

receiving means for receiving the carrier on which the ICs are mounted;

measurement means for performing measurements of the ICs;

defect decision means for making a defect decision on the IC sockets of the carrier on the basis of the measurement and for producing defect information representing a position of a defective IC socket corresponding to an IC socket which continuously belongs to a defective category CS a continuous number of defect times NS, the defect category CS and the continuous number of defect time NS being set in advance;

a storage device for removing the ICs from the carrier after completion of the measurement and for performing classified storage on the ICs so that the carrier is emptied and returned to the supply device; and avoiding means, activated based on the defect information, for avoiding delivery of an IC to a defective IC socket.

2. The auto-handler system as defined in claim 1, wherein the supply device comprises:

first carrier discrimination means, for reading the identification mark of the carrier, first store means, and first communication means;

wherein the measurement device comprises:

second carrier-discrimination means, for reading the identification mark of the carrier, second store means, and second communication means coupled to the first communication means, wherein the defect information is transmitted from the second communication means to the first communication means so that the defect information is written in the first store means and wherein the supply device controls transfer of ICs to the defective carrier based on a comparison between the defect information and the identification mark of the defective carrier.

3. The auto-handler system as defined in claims 2, wherein the measurement device controls measurement of ICs of the defective carrier in response to comparison between the defect information and the identification mark of the defective carrier such that measurement is not performed on an IC mounted on the defective IC socket of the defective carrier.

4. The auto-handler system as defined in claim 2, wherein the storage device comprises:

third carrier-discrimination means, for reading the identification mark of the carrier, third store means, and third communication means coupled to the second communication means of the measurement device, wherein the defect information is transmitted from the second communication means to the third communication means so that the defect information is written in the third store means, and wherein the storage device controls handling of ICs of the defective carrier in response to comparison between the defect information and the identification mark of the defective carrier in such a way that handling of an IC mounted on the defective IC socket of the defective carrier is not performed.

5. The auto-handler system as defined in claim 2, further comprising visual display means for providing visual display of the identification mark, positions of IC sockets to which ICs are supplied, and the defect information.

6. The auto-handler system as defined in claim 1, wherein the identification mark is a bar-code mark identifying the carrier.

7. The auto-handler system as defined in claim 1, further comprising visual display means for providing visual display of the identification mark, positions of IC sockets to which the ICs are supplied by the supply device, and the defect information if the defect information is produced.

* * * * *

UNITED STATES PATENT AND TRADEMARK OFFICE
CERTIFICATE OF CORRECTION

PATENT NO. :  
DATED      :  
INVENTOR(S) :

5,715,168  
February 3, 1998  
Daijiro Ito

It is certified that error appears in the above-identified patent and that said Letters Patent is hereby corrected as shown below:

Title Page, Item [57], in the Abstract, line 16, "an defective" should read --a defective--; and \* line 20, "ICs" should read --is--.

Signed and Sealed this

Ninth Day of March, 1999

*Attest:*

Q. TODD DICKINSON

*Attesting Officer*    Acting Commissioner of Patents and Trademarks